No. 823,212. PATENTED JUNE 12, 1906.
J. W. GAMBLE.
APPARATUS FOR PURIFYING AND REGULATING WATER.
APPLICATION FILED APR. 18, 1905.
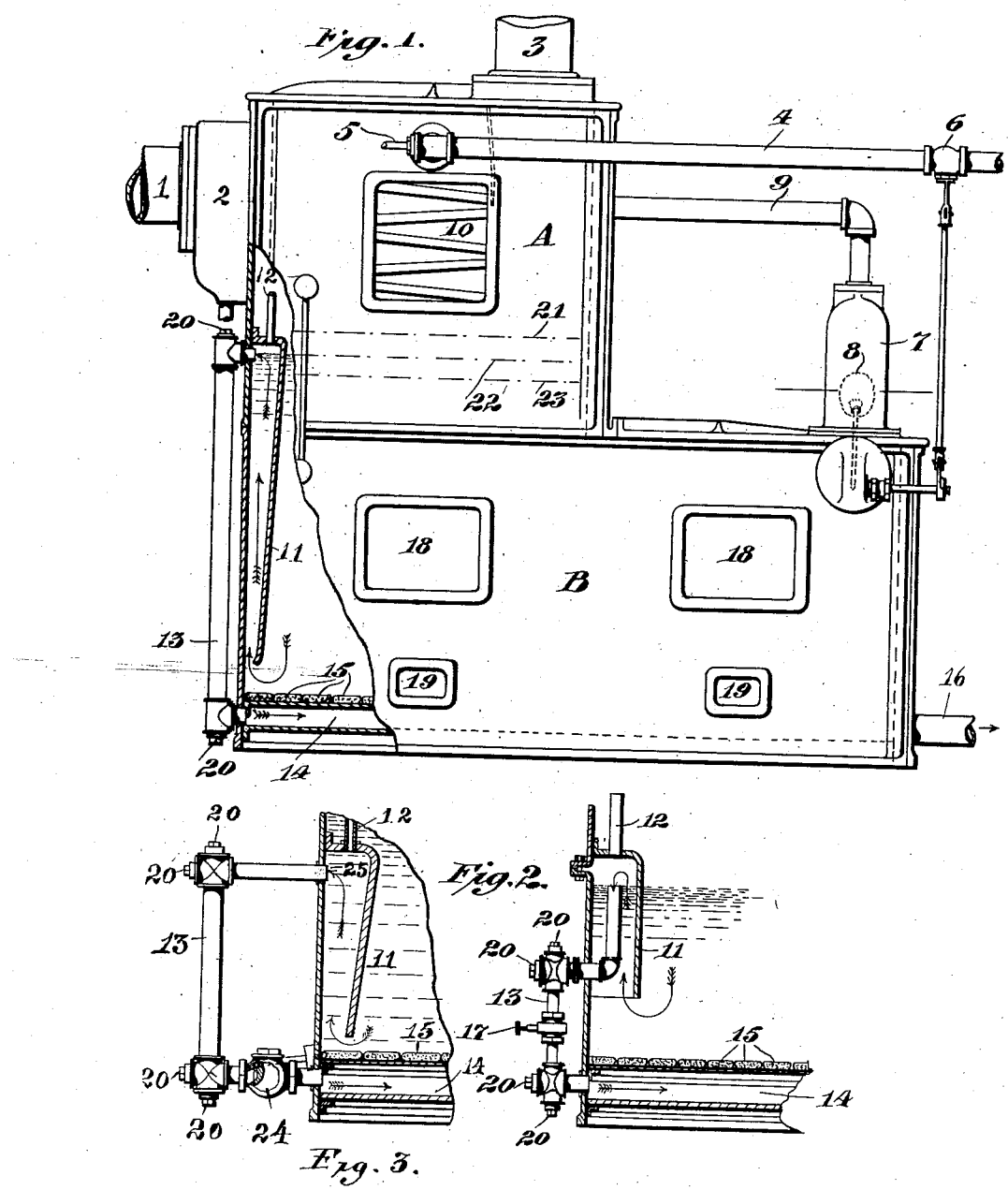

UNITED STATES PATENT OFFICE.

JOSEPH WILLARD GAMBLE, OF PHILADELPHIA, PENNSYLVANIA, ASSIGNOR TO JOSEPH S. LOVERING WHARTON, WILLIAM S. HALLOWELL, AND JOHN C. JONES, DOING BUSINESS AS HARRISON SAFETY BOILER WORKS, OF PHILADELPHIA, PENNSYLVANIA, A FIRM.

APPARATUS FOR PURIFYING AND REGULATING WATER.

No. 823,212.   Specification of Letters Patent.   Patented June 12, 1906.

Application filed April 18, 1905. Serial No. 256,262.

*To all whom it may concern:*

Be it known that I, JOSEPH WILLARD GAMBLE, a citizen of the United States, and a resident of and whose post-office address is Philadelphia, in the county of Philadelphia and State of Pennsylvania, have invented certain new and useful Improvements in Apparatus for Purifying and Regulating Water, of which the following is a specification.

My invention relates to improvements in apparatus for heating, purifying, and regulating a supply of liquid, but especially to the treatment of water, and more especially to the instances where chemical solution is supplied to the water, which is subsequently filtered and adapted for feeding boilers or other similar purpose.

The objects of my invention are especially, first, to provide means for insuring an ample supply of heated and treated feed-water irrespective of the condition of the filter; second, to provide means simple, positive, efficient, and automatic in operation.

Where chemical solution is supplied to feed-water in a heater, there is a consequent precipitation of impurities, which fall to the bottom of the tank and may be removed when necessary. Moreover, the rapidity with which this precipitation is accomplished varies according to the temperature of the water. These impurities, however, finally choke or reduce the effectiveness of the filter. When this occurs, of course the efficient operation of the whole system is seriously affected or is at a standstill, thus rendering inadequate the ultimate supply available for use, and it becomes necessary to secure an increased supply of water for the pump or other distributing means even if such supply be not so thoroughly prepared as it would be were there no obstruction and the apparatus operating at its usual capacity and performing its functions in the usual manner and sequence. It is important nevertheless that the necessary increment shall be both heated and so far as possible purified by the chemical treatment even if the precipitation has not been entirely removed by the filter. Therefore instead of relying upon the original cold-water supply for the increment I take it from the heater and purifier at some point in the circulation before or in front of the filter, and since the lower strata have been given more time for the precipitation and agglomeraton of the impurities I prefer to draw on them for my increment. It is obvious, moreover, that this process should be in general automatic and at the same time capable of regulation.

I accomplish the desired ends by the means described and illustrated in the following description and drawings and particularly claimed hereinafter.

In the drawings like symbols of reference refer to like parts throughout the respective views.

Figure 1 is an elevation of a combined heater, purifier, and filter embodying my invention, showing a portion of the casing broken away and the devices within principally in section. Figs. 2 and 3 show modifications of my invention, also partly in section.

In Fig. 1, A is the heater, which I prefer to place upon or over the tank B, containing the filter, because of the economy of space and compactness of operating means thus attained, though I do not limit myself to that location, since it is not necessary to the operation of the apparatus that it shall be in one integral structure or particular arrangement or form.

The tank B contains a filter-bed 15 and is provided with man and hand holes 18 19 for cleaning and the usual pipes for flushing and withdrawing waste, (the latter not here shown to avoid complicating the drawings and because they are well known in the art and common to such devices and are not parts of my invention.)

1 is the exhaust-pipe from engine or other source of steam-supply to the system. 2 is a separator. 3 is the outlet-pipe from heater to atmosphere. 4 is the cold-water feed; 5, the supply-pipe for a chemical solution or reagent such as is generally used for the purpose of forming, with the impurities in the water, an insoluble precipitate, as is well known. 6 is a valve in the cold-water-supply pipe operated automatically through intermediate mechanism by the float 8, rising and falling in the float-chamber 7 according as the water-level in the system rises or falls, all dependent upon the amount withdrawn from the same for utilization. 9 is the vent for the float-chamber; 10, the water-trays in the heater shown through an open manhole. All of these features being old, I will not particularly describe them further than I have done to make clear the advantage and operation of my improvement as follows:

11 is a hood or shield forming a chamber open at the bottom and so placed that this opening shall be comparatively close to the filter, or, in other words, in that stratum of the treated water which has been longest subjected to treatment.

12 is a vent-pipe to prevent siphoning.

13 is a device comprising pipes and fittings, all of which constitute a by-pass and attachments or means for carrying the water from in front of the filter to the discharge side thereof around the same and so leading a full supply to the outlet 16 irrespective of the condition of the filter. In Fig. 2 I have also shown a regulating-valve 17 in the by-pass and in all figures the plugs 20, which permit the by-pass pipes to be examined, cleaned, &c.

In Fig. 3, 25 is the inlet to the by-pass. 24 is a spring or otherwise loaded check-valve placed, preferably, in the lower run of the by-pass.

The operation of the device is as follows: Referring to Figs. 1 and 2, the cold-water feed enters through 4 in amount determined by height of water-line and regulated by float 8, operating valve 6, which float may be so adjusted as to establish any desired water-line either before or during the operation. A suitable amount of chemical reagent enters feed-water at 5 and mixes therewith. Then falling into trays 10 the mixture is heated by the exhaust-steam entering through 1 2, all of which is well known in the art and need not be more particularly described. The heated and chemically-treated water now gradually loses the impurities previously held in suspension by precipitation. As this process requires some time, of course the water that has been longest subjected to the treatment will generally contain the least impurities, since it has been given the most time for the precipitation and the agglomeration of the impurities. This is naturally the case with the lower strata. Normally the water passes progressively and continuously through the filter 15 into the passage or chamber 14 and so out through 16; but, as has been said, when the filter becomes clogged by the precipitates the supply of treated water passing through the filter may be so diminished that the quantity drawn from the filter and through the outlet 16 is far below the normal capacity of the apparatus and is entirely inadequate for the needs of the users. In such event the by-pass system 11 12 13 may be called into play as follows:

Owing to the choking of the filter, the water-line tends to rise until the supply of cold-water feed is entirely cut off by float 8 operating valve 6. Before this point is reached, however, the water-line rises over and covers the inlet of the by-pass and continues to flow therethrough until the water-line falls below the inlet of by-pass. Thus sufficient is diverted around the filter to make up the deficiency caused by its choking, and since I preferably take this increment from the lower portion of water I retain the advantage of all the treatment except the final one of complete filtration. This operation may be manually regulated by the adjustment of the float 8, as above stated, and also by the regulating-valve 17. (See Fig. 2.)

Referring now to Fig. 3, in order to render the system still more automatic and reliable it is sometimes desirable to place a resistance in the by-pass so that the filter is normally the line of least resistance, thus insuring the circulation through the filter at all times except when obstructed, and thus the by-pass will not begin to operate until this obstruction of the filter occurs and, moreover, insuring the resumption of interrupted circulation through the filter and consequent cutting off of by-pass as soon as the obstruction is removed. One way of accomplishing this is to place a spring-loaded swing check-valve or an equivalent device in the lower run of the by-pass. In the arrangement shown in Fig. 3, 24 is this resistance, specifically in this instance a swinging weight-loaded check-valve. The operation of this modification is as follows: The inlet 25 is habitually submerged, and if, with the head available, a sufficient supply passes through the filter-bed then all of the supply is taken from this source because of the obstruction to flow through the by-pass caused by the loaded valve 24 or other form of resistance. If, however, sufficient cannot be taken in this manner because of the obstruction or resistance of the filter-bed, then the withdrawal of water from the part of the tank beyond the filter-bed tends to decrease or overcome the resistance in the by-bass, or, as in the figure, to open the check-valve. Up to a certain point this tendency is ineffective. If, however, the resistance or obstruction of the filter-bed is still increased, the resistance in the by-pass is balanced and finally exceeded by the former, when the by-pass automatically opens and a supply begins to pass around the filter-bed sufficient to make up the difference between the quantity passing through the filter-bed and the total quantity required. Of course it will be understood that the resistance caused by the check-valve may be varied at will by changing the adjustment or load of the check-valve. I may also add the reguating-valve 17. (Shown in Fig. 2.)

It is evident that my improvement is not limited to its application in any particular kind of water-heater as the one illustrated; nor is it confined to use in a heater and purifier, as it might be equally applicable in a heater alone or a purifier alone; nor do I limit myself to any particular purpose for or process of heating or purifying, nor to any particular design, form, or arrangement of parts. Moreover, I do not limit myself to the purification of any particular liquid, as water, since my invention is applicable to the purification and regulation of any liquid and is so intended; nor do I limit myself to any particular form of resistance, as a spring-valve or loaded valve, as any resistance which will prevent the operation of the by-pass until the resistance of the filter becomes too great to allow an adequate supply of water to pass to the outlet will come within the intent and meaning of my invention.

Where I have used the words "varying inversely as the quantity passing through the filter," or words to that effect, I do not mean that the quantity in actual measurement which passes through the by-pass varies inversely as the actual quantity passing through the filter in any fixed ratio, as three parts to one part, or other fixed proportion; but I mean that the flow through the by-pass increases or diminishes in quantity inversely as the flow through the filter increases or diminishes.

What I do claim, and desire to protect by Letters Patent, is—

1. A filter; and a passage about the same opening into the outlet from the filter, and containing an obstruction adapted to be overcome as the resistance of the filter increases.

2. A filter; and a passage about the same opening into the outlet from the filter, and containing a loaded valve normally closed, but adapted to open when the resistance of the filter equals its own load.

3. A filter; and a passage about the same opening into the outlet from the filter, and containing a resistance adapted to be automatically overcome or renewed as the resistance of the filter increases or diminishes.

4. A filter; and a by-pass about the same opening into the outlet from the filter, and having a resistance therein greater than the normal resistance of the filter, adapted to be automatically overcome and established according as the resistance of the filter exceeds or falls below itself.

5. A filter; and a by-pass about the same opening into the outlet from the filter, and having an adjustable resistance therein, adapted to be overcome as the resistance of the filter increases.

6. The combination of a heater; a filter; and a conduit having its inlet covered by a hood vented at the top and opening below the water-line near the filter-bed, and having an outlet opening into the outlet of the heater.

7. The combination of a heater; a filter; and a conduit vented at the top and opening above and near the filter-bed, and having an outlet opening into the outlet of the heater, and provided with a resistance greater than the normal resistance of the filter-bed.

8. The combination of a water-purifier; a by-pass comprising a hood; a vent to said hood; a conduit, the inlet of which is located within the hood above the normal water-line, and the outlet of which communicates with the outlet of the purifier.

9. The combination of a water-heater; a chemical feeder; a filter; and means for automatically supplementing the outflow through the filter by an increment of chemically-treated water taken from a point near the filter and increasing in quantity according as the resistance of the filter increases.

10. The combination of a heater; a chemical-supply; a filter; and a by-pass around the filter to the outlet thereof, containing a resistance adapted to be automatically overcome as the resistance of the filter increases.

11. The combination of a water-heater; a chemical-supply; a filter; and means for automatically supplementing the outflow through the filter by an increment of chemically-treated water, varying inversely as the supply passing through the filter.

12. The combination of a heater; a chemical-supply; a filter; a conduit having an inlet at the water-line of the heater, and a closed hood vented at the top covering the inlet and opening below the water-line near the filter-bed, the outlet to the conduit opening into the outlet of the heater.

13. The combination of a heater; a chemical-supply; a filter; a conduit having a closed hood vented at the top covering the inlet to the conduit, and opening below the water-line near the filter-bed, and a loaded valve having a resistance greater than the normal resistance of the filter.

14. The combination of a heater; a chemical supply and feeder; a filter; and means for automatically supplementing the outflow from the filter by an increment of chemically-treated but unfiltered water.

15. The combination of a chemical water purifier and heater; a horizontal filter; and means for automatically and adjustably supplementing the outflow from the filter with an increment of chemically-treated but unfiltered water.

16. The combination of a filter and a submerged by-pass about the filter containing a resistance.

17. The combination of a filter, a submerged by-pass about the filter containing a resistance adapted to be overcome as the resistance of the filter increases.

18. The combination of a filter, a submerged by-pass about the filter, and means for automatically regulating the flow through the by-pass.

19. The combination of a filter, a submerged by-pass about the filter and means on the by-pass for automatically regulating the flow through the by-pass.

20. The combination of a filter, means for regulating the supply of water to the filter, and a submerged by-pass about the filter adapted to operate automatically when the water-level is above the normal.

Signed at Philadelphia, in the county of Philadelphia and State of Pennsylvania, this 14th day of April, A. D. 1905.

JOSEPH WILLARD GAMBLE.

Witnesses:
ROBERT JOHNS,
ROBERT G. CLIFTON.